United States Patent [19]

Silverio

[11] Patent Number: 4,493,031
[45] Date of Patent: Jan. 8, 1985

[54] MEMORY WRITE PROTECTION USING TIMERS

[75] Inventor: Vincent J. Silverio, Middletown, N.J.

[73] Assignee: AT&T Bell Laboratories, Murray Hill, N.J.

[21] Appl. No.: 411,270

[22] Filed: Aug. 25, 1982

[51] Int. Cl.³ .............................................. G06F 7/00
[52] U.S. Cl. .................................................. 364/200
[58] Field of Search ... 364/200 MS File, 900 MS File

[56] References Cited

U.S. PATENT DOCUMENTS

| 4,099,243 | 7/1978 | Plaumbo | 364/200 |
| 4,154,988 | 5/1979 | Fechalos | 179/18 B |
| 4,332,009 | 5/1982 | Gerson | 364/200 |

OTHER PUBLICATIONS

*Electronic Engineering,* Feb. 1979, "Z-80 Memory Write Protect" p. 27, E. Baddiley.

Primary Examiner—Raulfe B. Zache
Attorney, Agent, or Firm—John A. Caccuro

[57] ABSTRACT

A memory write-enable circuit is disclosed which protects data stored in a random access memory (RAM) from erroneous write commands. The circuit is enabled, permitting write commands to RAM for a fixed time interval, only when two predetermined control signals occur within a prescribed time period. The circuit is disabled either by the elapse of the fixed time interval or by a clear signal.

10 Claims, 2 Drawing Figures

MEMORY WRITE PROTECTION USING TIMERS

TECHNICAL FIELD

This invention relates to memory circuits and, more particularly, to a method and circuitry for preventing invalid write commands to a memory.

BACKGROUND OF THE INVENTION

Data processing systems typically include volatile memory such as random access memory RAM which can be altered or written-into under control of the system controller or CPU. Often the information contained in the volatile memory is data which has been manually entered into the memory and should be protected from accidental destruction. Undesirably, however, noise and system malfunctions can cause erroneous write commands which result in incorrect data being written over valid data in the volatile memory. Thus, a problem exists to provide write-protection for volatile memory of data procesing systems.

SUMMARY OF THE INVENTION

Accordingly, it is the primary object of the present invention to provide a method and circuitry for protecting the contents of volatile memory of a data processing system. The present invention enables a write operation to a volatile memory only for a predetermined interval of time following the unlocking of the memory by the occurrence of two consecutive control signals within a certain time interval. It is a further object of the present invention to protect a volatile memory from erroneous write commands using a first timer enabled in response to a first signal and a second timer responsive to the occurrence of a second signal during the interval of time when the first timer is enabled. Only during the interval of time that the second timer is enabled are write commands gated to the volatile memory.

In the preferred embodiment, a write command to a first memory address is decoded to enable the first timer and a second consecutive write command to a second address, an address which differs in several bit positions from the first address, occurring during the first time interval is decoded to activate the second timer. The utilization of the disclosed volatile memory write-enable sequence comprising two memory address words which differ in multiple bit positions and which occur as consecutive words on the address bus drastically reduces the vulnerability window of the volatile memory to noise or system malfunctions. Once the memory write-enable circuit is enabled write-command access to the volatile memory is limited to the time interval of the second timer.

BRIEF DESCRIPTION OF THE DRAWING

Other objects and characteristics of the present invention will be better understood from reading the description which follows with reference to the attached drawing in which.

DETAILED DESCRIPTION

Figure 1:
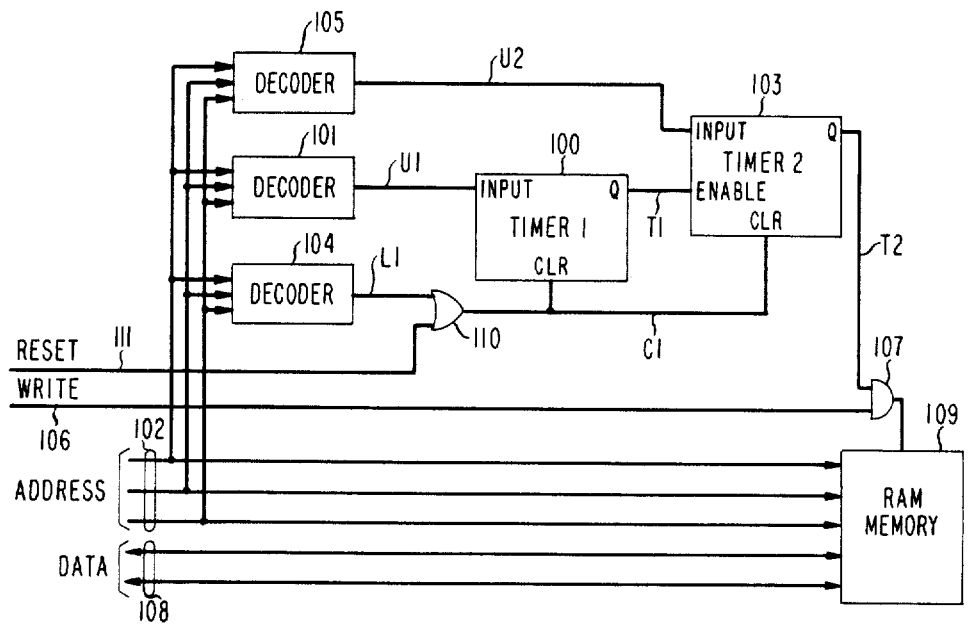
FIG. 1 illustrates a memory write-protect circuit according to the present invention.

Referring to FIG. 1, there is shown a preferred embodiment of a volatile memory write-protect (write-enable) circuit according to the present invention. In the preferred embodiment, the present invention is implemented using integrated circuits or other hardware circuitry rather than in CPU software or firmware. This minimizes the effect of a potential software or CPU malfunction which could result in the memory write-protect circuit being locked in an enabled state leaving the volatile memory unprotected and vulnerable to erroneous write commands. Nonetheless, it is to be understood that the present invention could likewise be implemented in software or firmware in a straightforward manner without deviating from the scope or spirit of the present invention.

Figure 2:
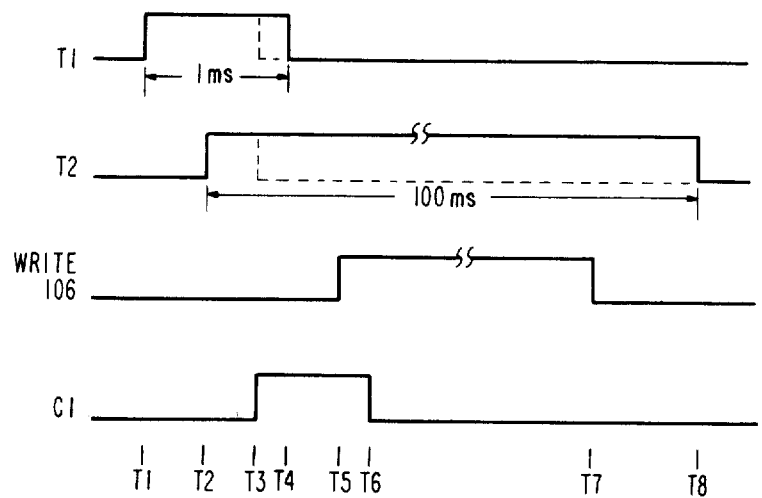
FIG. 2 shows a timing diagram for the circuit of FIG. 1.

The following description makes joint reference to FIGS. 1 and 2. In FIG. 1 the address, data, write and reset signals are provided by a program controlled data processing system, not shown, which utilizes the present invention.

Timer 100 is a well-known integrated circuit type monostable multivibrator arranged to provide an output pulse of about 1 millisecond (MS) on lead T1, e.g., T1–T4, in response to a first unlock signal U1 received on lead from decoder 101. Decoder 101 generates this first unlock signal U1 in response to decoding a first predetermined address word on memory address bus 102. The output Q of timer 100 outputs on lead T1 a 1 MS enable pulse beginning a time T1 to enable timer 103. The operation of the present write-enable circuit requires a second unlock signal to occur during this 1 MS enable pulse. During this 1 MS pulse, the second unlock signal on lead U2 occurring at time T2 triggers timer 103 causing a 100 MS write-enable signal on lead T2. The second unlock signal U2 is generated by decoder 105 which decodes a second predetermined address word on memory address bus 102. This second predetermined address word is different from, and subsequent to the first predetermined address word. To provide additional security the address of the second predetermined address word should differ in more than one bit position from the first predetermined address word.

Only during the 100 MS write-enable pulse on lead T2 are write commands received over lead 106 gated through AND gate 107 to enable data from bus 108 to be written into volatile memory 109 at the memory locations specified on memory address bus 102. When timer 103 expires at time T8, after about 100 MS, volatile memory 109 is again protected against erroneous write commands. The value of timer 103 is selected to enable sufficient time, e.g. T5–T7, to permit the desired number of write commands on lead 106 to be written into volatile memory 109.

If the second unlock signal U2 is not received during the 1 MS pulse from timer 100, timer 103 is not triggered. Thus, the first and second unlock signals U1 and U2 must be received within the 1 MS window to enable a 100 MS write-access interval to memory 109. In the event that the memory write operation is aborted or completed prior to the expiration of 100 MS, T8, the system generates a clear signal C1, e.g. at time T3–T6, to timers 100 and 103. Clear signal C1 is generated via OR gate 110 by either reset signal 111 or lock signal L1 from decoder 104. Clear signal C1 shown in FIG. 2 is generated from a reset signal 111 which causes an abort in the memory write operation at time T3. After the completion of a memory write operation, e.g. at time T7, lock signal L1 is generated by decoder 104, by decoding a particular address on memory address bus 102.

Thus, as contemplated by the present invention, a write operation to a volatile memory is enabled for prescribed time period by two consecutive write-commands addressed to different predetermined locations of the volatile memory and is terminated by a write command to a third predetermined location of the volatile memory. Note, unused memory locations or unused memory addresses can be utilized as the addresses to generate the two unlock signals U1 and U2 and lock signal L1.

It is to be understood that the time intervals of timers 100 and 103 can be set at any time value depending on the particular application. Since timer 100 directly affects the vulnerability window of the memory, it should be set at the smallest time interval which would just enable the reception of unlock signal U2. Thus, in the preferred embodiment, unlock signals U1 and U2 could be two consecutive words on address bus 102 and hence, timer 100 would be set accordingly. The memory access time is set by timer T2 and is determined by the number of words to be written into the volatile memory.

In the preferred embodiment, unlock signals U1 and U2 are generated from particular address (key) words on bus 102. To reduce the likelihood that noise or system malfunctions could duplicate these key words, the words are selected so that the address differs from each other in several bit positions. Thus, for example, a noise burst or a system malfunction which causes sequential address words on bus 102 will not likely be able to generate the particular address words within the time interval of timer 100.

It should be noted that unlock signals U1 and U2 could likewise be generated from other system control signals, other than particular memory write signals, which would precede write commands to the volatile memory. Similarly, clear signal C1 can be generated from any system control signal.

What has been described in merely illustrative of the application of the principles of the present invention. Other circuits and embodiments can be implemented by those skilled in the art without departing from the spirit and scope of the present invention.

What is claimed is:

1. A memory write-enable circuit comprising:
   first means responsive to a first input signal for generating an enable signal, and
   a second means responsive to said enable signal and to a second input signal received within a first predetermined time interval of said first input signal for generating a write-enable signal for enabling the writing of data into a memory.

2. The memory write-enable circuit of claim 1 wherein said enable signal exists for said first predetermined time interval and said write-enable signal exists for a second predetermined time interval longer than said first predetermined time interval.

3. The memory write-enable circuit of claim 1 further comprising:
   decoder means for generating said first input signal and said second input signal from control signals.

4. The memory write-enable circuit of claim 3 wherein said decoder means generates said first input signal and said second input signal by decoding address signals on a memory address bus.

5. The memory write-enable circuit of claim 1 further including:
   a clear circuit responsive to a third signal for clearing said first means and said second means.

6. The memory write-enable circuit of claim 5 wherein said clear circuit generates said third signal by decoding signals on said memory address bus.

7. The memory write-enable circuit of claim 1 wherein said first and second means are monostable multivibrator circuits.

8. A method of selectively enabling write commands to a memory circuit of a program controlled apparatus, the method comprising the steps of:
   detecting the occurrence of two control signals from said program controlled apparatus within a first time interval and
   enabling write commands to said memory circuit for a second time interval following said detecting step.

9. The method of claim 8 wherein said detecting step includes the steps of:
   starting a timer means external to said program controlled apparatus in response to a first control signal from said program controlled apparatus, and
   generating a second time interval in response to a second control signal occuring during said first timer interval.

10. The method of claim 8 further comprising the step of:
    terminating the first and second time intervals in response to a clear signal from said program controlled apparatus.

* * * * *